United States Patent [19]

Theuerkaue

[11] 3,812,548

[45] May 28, 1974

[54] TOOL HEAD WITH DIFFERENTIAL MOTION RECEDE MECHANISM

[75] Inventor: Fred Theuerkaue, Naples, Fla.

[73] Assignee: The Pipe Machining Company, Wickliffe, Ohio

[22] Filed: Dec. 14, 1972

[21] Appl. No.: 315,113

[52] U.S. Cl. ............... 10/120.5 R, 10/94, 10/96 T, 408/158
[51] Int. Cl. ......................... B23g 1/26, B23g 5/04
[58] Field of Search..... 10/89 H, 94, 96 T, 102.5 R, 10/96 R, 95; 279/67, 71, 121; 408/153, 158, 160, 161, 179

[56] References Cited
UNITED STATES PATENTS

| 2,054,028 | 9/1936 | Benninghoff.................... | 10/120.5 R |
| 2,079,853 | 5/1937 | Greenwood et al. .................. | 10/95 |
| 2,679,057 | 5/1954 | Sawdey.......................... | 10/120.5 R |
| 2,746,066 | 5/1956 | Finn et al....................... | 10/120.5 R |
| 3,165,768 | 1/1965 | Herbkersman...................... | 10/87 |
| 3,645,638 | 2/1972 | Theuerkauf..................... | 10/120.5 R |

*Primary Examiner*—Charles W. Lanham
*Assistant Examiner*—E. M. Combs
*Attorney, Agent, or Firm*—John Harrow Leonard

[57] ABSTRACT

A rotary die head for threading pipe is moved axially toward and away from the end of a coaxial pipe during rotation of the head. Circumferentially spaced die carriers are mounted in the head for reciprocation radially thereof. During rotation and advance of the head, the carriers apply dies to the pipe, and a common drive element advancing the head is engaged and held by the end of the pipe so that the head is moved axially relative thereto during advance of the head. The drive element drives novel differential motion devices, arranged one for each carrier. Each differential motion device recedes its carrier, from a radial starting position during the advance. A common power driven collapse and reset mechanism is mounted in the head and is drivingly connected to the differential motion devices and is operated by the common drive element to (a) collapse the carriers radially for disengaging their dies from the pipe at the end of the advance of the head; (b) to maintain the carriers in collapsed position during retraction of the head, and (c), before the next advance of the head to starting position, to reset the carriers in the radial starting position for the next threading cut. Precision in recede is enhanced by the differential motion provided by the devices. All of the operating parts for effecting those operations are contained in a compact head which is relatively short axially and which can be used on a conventional rotary spindle machine in which the relative advance of the head is by acvancing the head toward a stationary pipe or advancing the pipe towrd the head.

5 Claims, 10 Drawing Figures

TOOL HEAD WITH DIFFERENTIAL MOTION RECEDE MECHANISM

BACKGROUND OF THE INVENTION

1. Field of Invention

A tool head for applying a tool to a workpiece and for receding the tool outwardly laterally from the workpiece in fixed relation to the relative advance of the tool endwise of the workpiece.

2. Description of Prior Art

The present invention is described herein as embodied in a machine designed primarily for cutting threads on pipes, its application to other machining operations being apparent from the illustrative example.

It is conventional in the pipe threading field to provide a rotary spindle machine with a tool or die head mounted thereon for rotation about the axis of the spindle. A chuck is arranged at one end of the machine and holds the pipe in coaxial relation to the rotary head. During rotation of the head, the pipe and head are advanced relative to each other. Radially movable die carriers in the head carry threading dies.

During the rotation and relative advance, the carriers are receded from a radial starting position so as to cut a tapered thread. At the end of the cutting operation, the carriers are collapsed so as to clear the dies from the pipe and, while they are collapsed, the head is retracted from the pipe to its axial starting position. After loading the next pipe into the chuck, the head is advanced to starting position, the carriers being reset in their radial starting position prior to engagement of the dies with the next successive pipe and the initiation of the next threading operation.

A machine of this general character is disclosed in United States Letters Patent No. 2,054,028, issued Sept. 8, 1936, William L. Benninghoff. As therein disclosed, the machine is for cutting either internal or external threads, as the case may be, this feature now being conventional in many threading machines.

In the prior machines, chaser blocks or die carriers for the pipe threading cutting chasers or dies are mounted in the head for reciprocation radially thereof. The carriers are driven by a carrier driving element coaxial with the head and arranged to be engaged by the end of the pipe and moved axially at constant speed during relative advance of the pipe and spindle machine. The carriers are receded by, in timed relation to the advance of the head, an expensive recede mechanism which is operated by the driving element and which extends through the head endwise thereof, and entirely through the spindle. Also, the collapse and reset mechanism is arranged at the opposite end of the machine from the rotary head and connected to the carriers by an intricate concatenation of parts. Generally, in the Benninghoff machine, a single collapse mechanism is employed, as the machine was designed primarily to cut single continuous, uninterrupted, tapered thread on the pipe.

Later, it became desirable to provide stepped threads on pipes. In stepped threads, each thread portion is tapered at the same angle as the others, but each portion starts at a diameter greater than the maximum diameter of its predecessor in the series which begins at the end of the pipe. Any number of successive steps or successive different diameters of tapered thread can be cut by this double collapse mechanism.

The present machine is also directed specifically to the cutting like tapered threads or to cutting tapers on cylindrical surfaces. It may be used also for cutting cylindrical threads. Further, it may be provided with a double collapse mechanism, such as disclosed in U.S. Pat. No. 3,165,768, of Earle C. Herbkersman, issued Jan. 19, 1965, so as to be operative to cut stepped cylindrical or tapered threads.

The present invention is directed to achieving the same ends as the prior art, but by a much simpler structure in which the recede mechanism is carried directly in the die head. More specifically, each tool carrier is receded by a differential motion device which, due to the differential motion, assures extremely precise operation. These devices also are mounted in the head. The same differential motion device functions as part of the collapse and reset mechanism.

The present invention permits the use of a shorter head with less overhang than heretofore required, thus making possible a very rigid and compact machine.

The differential motion device for each head can be removed and a selected different differential motion device substituted therefor, thereby changing the rate of recession of the associated carrier. The head, with its included recede, collapse, and reset mechanism, is adapted for use on standard spindle machines without the necessity for the sine bar and recede mechanisms heretofore considered essential in the case of rotary spindle threading machines.

SUMMARY

The present invention is directed to cutting tapered threads, or tapered surfaces, of uniform diameter or stepped, on a workpiece by one or more cutting tools or chasers concurrently operable during relative advance of the workpiece and the tools or chasers as a group. This is achieved by the mounting of the tool or chaser carriers in a rotary head in which differential reset and recede mechanism is also contained so that the head can be used in a conventional rotary spindle machine.

Specific advantages of the present apparatus will be apparent from the following description wherein reference is made to the drawing.

Figure 1:
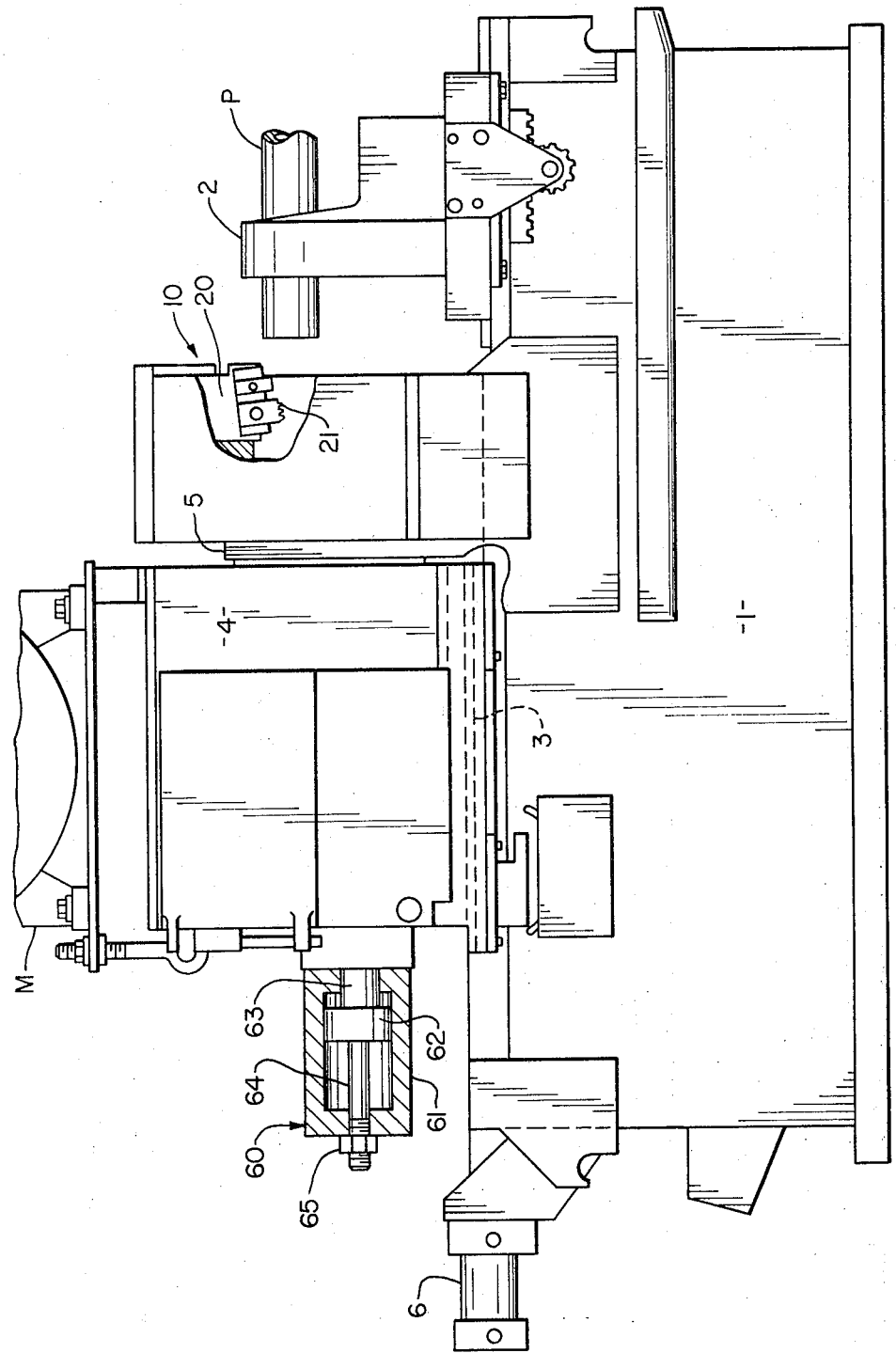
FIG. 1 is a side elevation of a rotary spindle machine with the rotary die head of the present invention mounted thereon.
Figure 2:
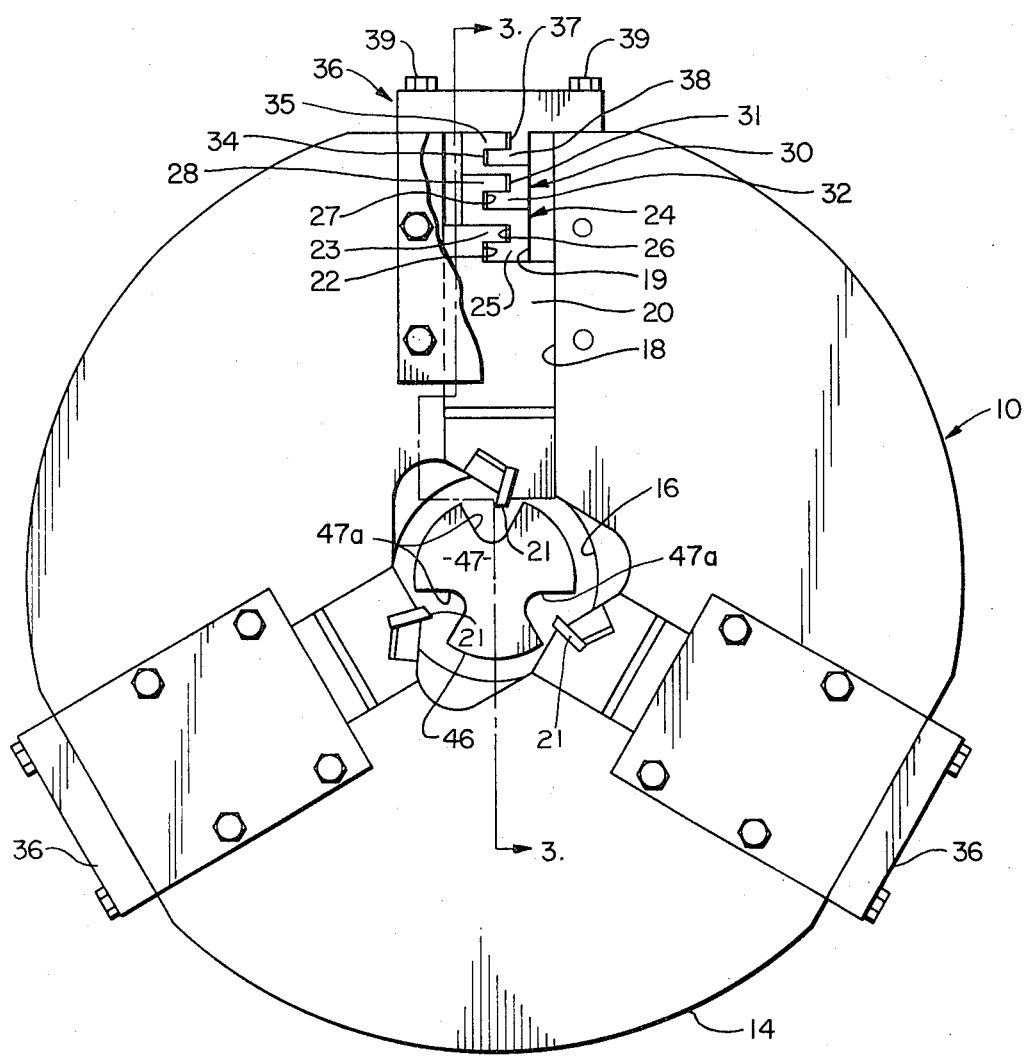
FIG. 2 is an enlarged front elevation, partly in section, of the rotary head.

Referring first to FIG. 1, a die head is shown as installed on a rotary spindle machine comprising a frame or bed 1 on which is mounted a work holding chuck 2. The chuck 2 is adapted to grip a length of pipe P to be threaded and to hold the pipe in fixed axial position relative to the chuck and bed with one end of the pipe projecting from the chuck toward the spindle machine for purposes of being engaged by the dies of the rotary head. Mounted on suitable guideways 3 on the bed is a spindle carriage 4 in which is rotatably mounted a spindle assembly 5. With this arrangement, the spindle can be moved toward and away from the chuck 2 axially of the pipe.

The carriage 4 is arranged for rapid traverse axially from a fully retracted position to a starting position at which the threading operation is to be initiated, and for rapid return from its final position, upon completion of the thread, to a fully retracted position. For this purpose, a suitable reversible hydraulic piston and cylinder assemblage 6 is secured to the bed 1 and is connected to the spindle carriage 4 for sliding the spindle carriage in the advance and retract directions along the guideways 3. The spindle head 5 is driven by a suitable motor M. Transmission mechanism connects the motor M and carriage 4 for advancing the carriage in timed relation to the rate of rotation of the head.

The mechanism so far described is disclosed in U.S. Pat. No. 3,165,768, of Earle C. Herbkersman, issued Jan. 19, 1965.

The present invention is concerned primarily with the rotary die head with its self-contained differential motion devices for setting, receding, collapsing, and resetting the dies.

For purposes of illustration, the head is shown as one in which the dies are arranged for cutting external tapered threads on pipe, its uses for other types of threads and other purposes being apparent.

As herein specifically disclosed, the die head 10 comprises an annular supporting plate 11 which is secured by suitable bolts 12 to the spindle head 5, for rotation therewith about the spindle axis. A rigid main body 14, having a thick forward flange portion 14a, is connected at one end to the supporting plate 11 by suitable bolts 15 for rotation with the plate and spindle. The body 14 has a central axial bore 16 which extends endwise entirely therethrough. The flange portion 14a has a plurality of radial slots or guideways 18 spaced apart from each other circumferentially of the axis of the body 14 and extending from the central bore 16 outwardly toward the outer periphery of the body 14. Cam guideways 19 extend radially of the body 14 and, at the radially inner ends, connect with the outer ends of the guideways 18, respectively. The guideways 19 extend radially to the outer periphery of the body 14 and extend endwise of the body from its front face through the rear face of the flange portion 14a. The guideways 18 open at their outer ends into the guideways 19, respectively, and are open at the front of the body 14. Die carriers 20 are mounted in the guideways 18, respectively, for co-rotation with the body 14 and for radial reciprocation relative thereto concurrently with the rotation of the head.

In the form illustrated, each of the die carriers 20 is a so-called chaser block for thread cutting and carried at its inner end a detachable carbide chaser 21. Since the carriers and their operating mechanisms are the same only one carrier and its operating mechanism is described in detail.

At its outer end each carrier 20 has a driving cam slot 22 and cam rib 23. For driving the carrier 20 in opposite directions radially of the rotative axis of the head, a cam block or element 24 is provided. The cam element 24 has a driving rib 25 slidably received in the cam slot 22, and a driving slot 26 which slidably accommodates and guides the rib 23 of the carrier 20 so that the carrier 20 can be reciprocated radially upon driving the cam element 24 parallel to the axis of the head while the element 24 remains parallel to its initial position. The carrier 20 is retracted away from the axis of the bore 16 upon movement of the cam element 24 toward the rear of the body 14 and is advanced or extended toward the axis of rotation upon movement of the cam element 24 toward the front of the body 14.

The cam element 24 for each head is mounted in the associated slot 19 for guided reciprocation endwise parallel to the axis of the body 14, for rotation with the body 14, and for movement bodily radially of the body while parallel to its starting position and while constrained to rotation with the body.

Cam slots 22 and 26, and their parallel coacting ribs 23 and 25 slope endwise of the body 14 from their forward outer ends inwardly to their rear inner ends at the same preselected angle. The slots 22 and 26 are open at both ends. The cam element 24 also has a cam slot 27 and a rib 28 parallel thereto. An outer or collapse and reset cam element 30 is mounted in the guideway 19, radially outwardly from the cam element 24. The collapse and reset cam element 30 has a cam slot 31 which slidably accommodates the rib 28 of the cam element 24, for sliding guided movement, and a rib 32 which is slidably mounted in and guided by the cam slot 27 of the cam element 24. Outwardly radially beyond the slot 31, the collapse and reset cam element 30 has a collapse slot 34 and rib 35. Mounted on the outer periphery of the head 14 in alignment with the guideways 18 and 19 is a stationary cam element 37 having a cam slot 37 which accommodates the rib 35 and a guide rib 38 which is accommodated in, and guided by, the slot 34. The slots 27 and 31, with the cooperating guide ribs 28 and 32 also slope radially inwardly from the front end of the body 14 rearwardly at a preselected angle, but this angle is more acute than the angle of slope of the slots 22 and 26 so that the slots 27 and 31 are less steep than the slots 26 and 22 and diverge rearwardly of the body therefrom. It is the divergence of these slots relative to each other from the front of the body 14 toward the rear which provides the differential motion desired for receding the carriers 20 as the body 14 is advanced relatively toward the pipe P for cutting the tapered threads.

The slots 34 and 37 and ribs 35 and 38 are parallel to each other and extend parallel to the axis of the body 14. As a result, the cam element 30 can be retracted rearwardly parallel to the axis of the spindle for collapsing the carriers 20 and their dies or chasers 21 at the end of the threading operation and can be advanced forwardly for driving the carriers 20 inwardly toward the axis of rotation to their reset or radial starting position preparatory to the next cut.

Here it is to be noted that this arrangement is for cutting external threads, starting at the end of a pipe and receding the carriers 20 to increase the diameter of the thread as the head 5 advances. However, the carriers 20 and their cams can be reversed and the dies carried on forward extensions, extending forwardly of the die head 10 from the carriers for advancing and receding the carriers during rotation and advance of the head 10 toward a pipe coupling for cutting internal threads in the coupling which taper from the engaged end of the coupling toward its opposite end.

Thus the cam elements 24, 30 and 36, by a differential in the slope of the slots 26 and 27, provide a differential motion device for receding the carriers 20 in timed relation to the advance of the head 10 during its rotation.

Referring next to the manner in which the differential motion device is operated in timed or fixed relation to the advance of the head 10, a driving mechanism which is common to the differential motion devices and which is driven by the pipe is employed.

For convenience in manufacture and servicing, the outermost cam elements 36 are used also as closure plates for the outer ends of the guideways 19, and are fastened to the body 1 by suitable bolts 39. In the space between the flange or plate 11 and the rear of the flange portion 14a of the body 14, a suitable frustoconical closure shield 41 is mounted. The shield 41, at its forward end, has a flange portion 42 which fits telescopically on the external periphery of the body portion 14a and a complementary portion 43 on the rear end of the cam element 36. At its opposite end the shield 41 is secured by suitable bolts 44 to the supporting plate 11.

The differential motion driving mechanism includes a carrier driver in the form of a cylindrical slide 45 which is mounted for axial reciprocation in the bore 16 and which carries at its forward end a coaxial pressure pad 46. The pressure pad, at its forward end, has a head portion 47 with suitable cut-outs 47a so that the head portion will not interfer with the chasers or dies 21. The head portion 47 is adapted to be engaged by the end of the pipe P as the spindle, with the head 10 thereon, is advanced toward the pipe a predetermined distance. After engagement, continued advancement of the spindle toward the pipe results in the head 10 being advanced relative to the pad 47 and hence forwardly relative to the slide 45. A pin 48 is rigidly secured in the recede slide 45 and extends radially outwardly therefrom. Its outer portion carries a sleeve 49 which is received in press fitted relation in a suitable socket 50 in the cam element 24. The sleeve 49 is mounted for sliding movement on the pin 48 with very slight operating clearance. The sleeve 49, at its outer end, remains securely in fixed position in the cam element 24 so as to move the cam element 24 forwardly and rearwardly of the head 10 upon forward and rearward movement of the slide 45 relative to the head. It is apparent that with this arrangement, continued advancement of the head at a uniform rate after engagement of the pad 47 with the end of a pipe P, results in the driving of the cam element 24 relatively rearwardly of the head 10 at a uniform rate. It is to be noted that, due to the inclination of the slot 31, it imparts to the cam element 24 inward and outward radial components of movement as the cam element 24 is moved rearwardly and forwardly, respectively, of the head 10. It is to compensate for these radial components of movement that the sleeve 49 must be slidable axially of, and relative to, the pin 48.

It is necessary also to collapse of the dies or chasers 21 at the end of the threading operation and to retain them in collapsed condition during retraction of the head 10 from the pipe P. It is necessary also to reset the dies 21 at the proper radial position for starting their cut upon subsequent advance of the head toward the pipe to a predetermined starting position.

For this purpose, the die collapse and reset slide 52 is mounted in the bore 16, in coaxial relation to the slide 45, for sliding guided movement axially of the bore 16. The slides 45 and 52 are spaced apart from each other axially and are biased resiliently into this spaced relation by one or more springs 53. Each spring 53 operates in a suitable retaining sleeve 54 which bears at its outer end or forward end against the rear end of the slide 45. The slide 52 carries a pin 56, similar to the pin 48, and carrying a like sleeve 57. The sleeve 57 may be mounted for rotation about the axis of, and for sliding movement axially of, the pin 56. The sleeve 57, like the sleeve 49, is of a square outer periphery cross section and at its outer end is disposed in a socket 59 in the cam element 30. Here, also, the sleeve 57 may be fixedly secured in the cam element 30, if desired.

In either event, the sliding tolerances are so precise that they do not effect the accuracy of the threads to be produced.

Figure 3:
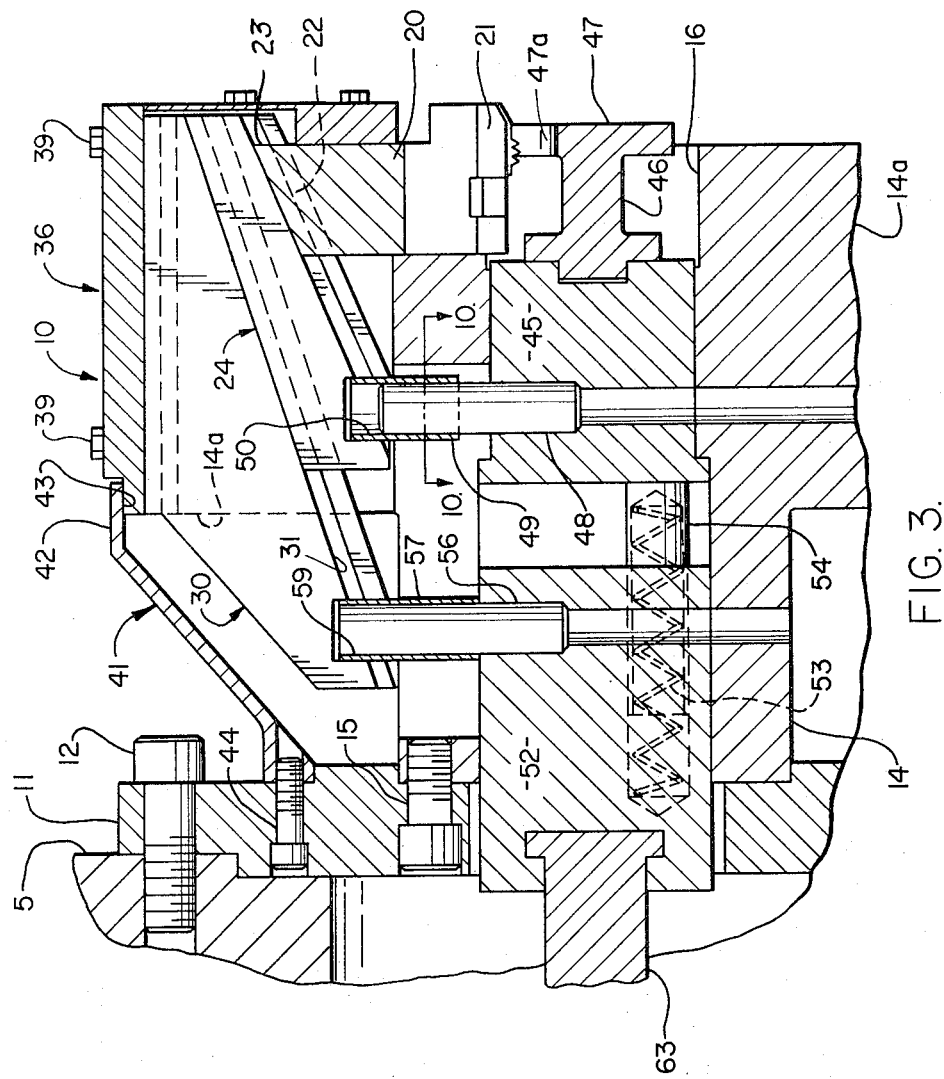
FIG. 3 is a fragmentary longitudinal sectional view of the rotary head and part of the spindle machine, and is taken on the line 3—3 in FIG. 2.
Figure 4:
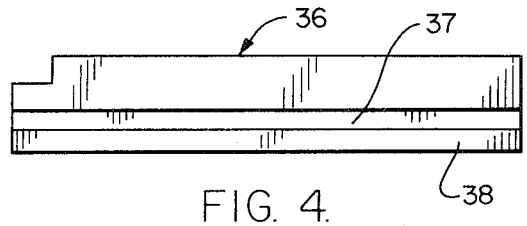
FIG. 4 is a front elevation of one of the elements of the differential motion device used in the present invention.
Figure 5:
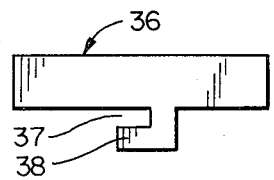
FIG. 5 is a right end elevation of the element illustrated in FIG. 4.
Figures 6, 7:
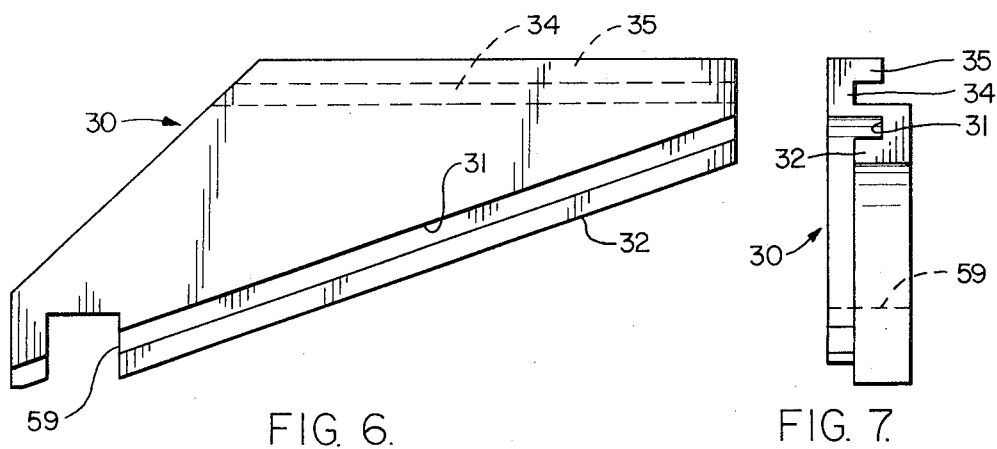
FIG. 6 is a front elevation of an intermediate element of the differential motion device of the present invention.
FIG. 7 is a right hand elevation of the element illustrated in FIG. 6.
Figures 8, 9:
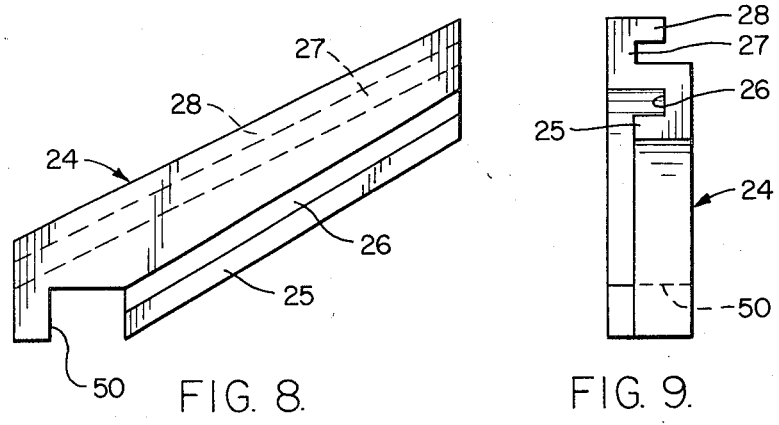
FIG. 8 is a front elevation of the carrier receding block of the differential motion device.
FIG. 9 is a right end elevation of the block illustrated in FIG. 8.
Figure 10:
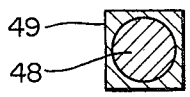
FIG. 10 is a cross sectional view of a connecting pin and is taken on the line 10—10 in FIG. 3.

As the slide 52 is moved rearwardly of the head 10, or to the left in FIG. 3, it pulls the collapse and reset element 30 to the left and the cam element 30, in turn, pulls the cam element 24 radially outwardly. This action moves the cam element 24 radially outwardly and with it the carrier 20 and its die 21 to collapsed position.

This movement of the slide 52 to the left is for rapid collapse of the dies at the end of the cutting operation, at which time the slide 45 has moved against the compression of the spring 53 to its innermost position and the slide 52 is biased to the left by the spring 53.

In order to drive the slide 52 for collapsing and resetting the dies, a suitable reversible piston and cylinder assemblage 60 is provided. This assemblage comprises a cylinder 61 with a double end piston 62, having a main drive rod 63 which is connected to, and preferably in coaxial relation with, the slide 52. To set the dies, while the slide 45 is held fully advanced by the spring 53 and the head 10 is retracted, pressure fluid is delivered to the cylinder 61 at the opposite side of the head from the rod 63. Thereby the piston 62 is driven to the right and therefore drives the slide 52 to the right, and with it the collapse and reset cam element 30. Due to the cooperation of the slots 27 and 31 with the ribs 28 and 32, this forward movement of the slide 52 drives the cam element 24 inwardly toward the axis of the head, thereby driving the carriers 20 and dies 21 inwardly, the cam element 24 remaining in fixed forward position endwise of the head during this operation. At the end of the piston 62 opposite from the rod 63, the piston is provided with an adjusting rod 64 which extends through the adjacent end of the cylinder 61 and is provided with a suitable lock nut 65. By adjustment of the position of the nut 65 along the rod 64, the forward advance of the slide 52 is predetermined, being limited by engagement of the nut 55 with the rear end of the cylinder 61. This nut is adjusted for the particular radial starting position desired for the dies, and, when operated, sets the dies to the proper radial position for initiating the cutting or threading operation. The assemblage 60 retains the carriers 20 and dies 21 in the starting position and holds the reset and collapse cam element 30 in fixed position during advance of the head.

At the end of the threading cut, the pressure to the cylinder 61 is reversed. This occurs while the slide 45 is held in retracted position by the pipe. Upon this reversal of the pressure, the cam element 30 is drawn suddenly toward the rear of the head 10 and, due to the slope of the slots 27 and 31, moves the cam element 24 and thereby the carrier 20, outwardly, thus collapsing the die 21.

As an example of the divergence of the slots 22 and 26 relative to the slots 27 and 31, the slots 22 and 26 may have a taper per inch of 0.3645 inches, whereas the slots 27 and 31 have a taper per inch in the same direction of 0.3333 inches, thus providing a differential of 0.0312 inches of taper per inch of pipe length. Obviously, by the arrangement described, substantially any degree of taper within the overall capacity of the machine is obtainable merely by varying the taper of one set of slots such as 22 and 26 relative to the other set of slots 27 and 31.

SUMMARY OF OPERATION

The starting position is illustrated in FIG. 3. In that position the carriers 20 are in their innermost position ready to start a cut, and the slide 45 and cam element 24 are in their starting positions. During the threading or cutting operation, the carriers 20 are to be receded outwardly away from the axis by the cam elements 24 until the cutting operation is completed, and thereupon moved further outwardly from the axis to a collapsed position clear of the workpiece by the cam element 30. Further, in FIG. 3, the slide 52 is in a recede control position for starting the cut, and is held fixedly in this position by the piston and cylinder assemblage 60. It is to remain in this position until the cut has been completed and the dies are to be collapsed outwardly to their fully collapsed position for removal of the workpiece or pipe.

As the pipe is fed to the left in FIG. 3 relative to the head, it engages the pad 47 and drives it and the slide 45 to the left. The slide 45, through the pin 48 and sleeve 49, drives the cam element 24 to the left, thereby causing the set of interengaging companion cam surfaces of the carrier 20 and cam element 24 to recede the carrier 20 outwardly from the axis, the rate of recession relative to a unit of travel of the slide or carrier driver 45 to the left depending upon the slope of these companion cam surfaces. This is a somewhat conventional type of carrier recession. However, the recession of the carrier 20 outwardly from the axis due to this first set of companion cam surfaces would be greater than desired and a certain amount of the carrier movement outwardly due to axial movement of the cam element 24 is subtracted by concurrent movement of the cam element 24 inwardly by the second set of interengaging companion cam surfaces of the cam element 24 and the cam element 30, which latter set causes the element 24 to move inwardly toward the axis while it is receding the carrier 20 by axial movement to the left.

Due to the lesser degree of slope of the slot 31 relative to the slot 22, even though the cam element 24 is being moved inwardly toward the axis of the head by the cam element 30, the cam element is receding the carrier 20 progressively farther from the axis.

This differential action continues until the slide 45 bottoms against the slide 52, at which time the carrier 20 has been fully receded from the axis to run out the thread or cut.

Thereupon the slide 52 is moved instantly to the left by the piston and cylinder assemblage 60 and moves the cam element 30 to collapse position. This movement of the cam element 30 moves the cam element 24 instantly farther radially outwardly and thereby moves the carrier 20 beyond outermost receded position to collapse position clear of the workpiece, after which the workpiece is removed.

Upon removal of the workpiece, the spring 53 forces the slide 45 to the right to its starting position, thereby driving the cam element 24 to starting position endwise of the head and driving the carrier 20 inwardly toward the axis.

The piston and cylinder assemblage 60 is reversed, driving the cam member 30 to the right to its recede control position, thus moving the cam element 24 radially inwardly and eliminating the collapse of the carrier 20, and bringing the carrier 20 to its innermost or starting position. The slide 52 remains in its right hand recede control position, as illustrated in FIG. 3, until the next cutting cycle is completed.

In the illustrative example, the differential cam elements and slots for advancing and receding the die carriers 20 are shown as lineal for constant rates of recede and advance. If a variable rate of advance or recede of the die along different portions of the cut are desired, the slot 26 in the cam block 24 may be curvilinear and the rib 23 of the carrier 20 may be supplanted by a pin which can follow along the slot 26.

If a stepped pipe thread or surface is to be provided, then a double collapse mechanism, such as described in the above U.S. Pat. No. 3,165,768, may be substituted for the piston and cylinder assemblage 60.

The piston and cylinder assemblage 60 may be controlled by conventional limit switches which control a conventional solenoid operated reversing valve through which the piston and cylinder assemblage is connectable to a source of pressure fluid and to a sump. The limit switches may be positioned to be operated by suitable abutments or arms on the carriage 4 if it is to be moved for advancing and retracting the head relative to the pipe, or by abutments or arms on the chuck if the chuck is to be advanced and retracted.

I claim:

1. An apparatus comprising:
 a rotary tool head having an entry end to which a workpiece is fed axially of the head for threading;

a tool carrier mounted in the head at said entry end for rotation with the head about the axis of rotation of the head and for reciprocation radially of said axis concurrently with said rotation;

a carrier driver mounted in the head for movement axially thereof toward said entry end to a starting position and away from said end to a retracted position, and arranged to be engaged and moved away from said starting position by the workpiece upon concurrent relative movement of the head and workpiece toward each other axially of the head;

a first cam element mounted in the head for movement endwise of the head toward said end to a starting position and away from said end to a retracted position, and concurrently for movement in opposite directions radially of the head;

means drivingly connecting the first cam element and driver for driving the first cam element to its starting position upon movement of the driver to its starting position and for driving the first cam element to its retracted position upon movement of the driver to its retracted position;

said first cam element and said carrier having a first set of interengaging companion carrier driving cam surfaces extending generally endwise of the head and sloping toward said axis in a direction away from said entry end toward the other end of the head at a first predetermined angle such that, upon movement of the first cam element away from the entry end, the carrier is receded radially outwardly from said axis by the first cam element;

a second cam element mounted in the head in a recede control position;

said first and second cam elements having a second set of mutually interengaging companion cam driving cam surfaces extending generally endwise of the head and sloping toward said axis in a direction away from said entry end toward the other end of the head, at a second predetermined angle such that upon movement of the first cam element from its starting to retracted position while the second cam element is in its recede control position, the first cam element is moved by the second cam element toward said axis;

said second predetermined angle being less than said first predetermined angle so that for each unit of axial movement of the driver from starting position the amount of recession of the tool carrier imposed thereon by the first cam element is greater than, but is reduced by, the amount of approach of the first cam element toward said axis imposed thereon by the second cam element; and means to return the carrier driver and first cam element to their starting positions when the workpiece is removed.

2. The apparatus according to claim 1 wherein the cam surfaces of each of said sets of mutually interengaging companion cam surfaces are lineal.

3. The apparatus according to claim 1 wherein the second cam element is supported in the body for movement, in a direction farther away from said end, from its recede control position to a collapse position, for causing said second set of mutually interengaging companion cam surfaces to move said first cam element outwardly, at any position of the first cam element endwise of the head, from its recede control position to a collapse position for causing the second cam element to move the carrier outwardly beyond recede position to collapsed position, and to return to its recede control position for resetting the carriers.

4. The apparatus according to claim 3 wherein power means are connected to the second cam element and are operable to drive the second cam element instantly from said recede control position to said collapse position, and to return the second cam element instantly, to recede control position, selectively.

5. The apparatus according to claim 4 wherein the power means include a slide mounted in the head for movement endwise of the head in coaxial relation to the carrier driver and connected to said second cam element, and resilient biasing means are interposed between said slide and driver to bias the carrier driver to starting position.

* * * * *

UNITED STATES PATENT OFFICE
CERTIFICATE OF CORRECTION

Patent No. 3,812,548          Dated May 28, 1974

Inventor(s) Fred Theuerkauf

It is certified that error appears in the above-identified patent and that said Letters Patent are hereby corrected as shown below:

Title page - after "Inventor" read --Fred Theuerkauf--.
             after "Assignee" read --The Pipe Machinery Company--.
Abstract - 2nd Col. line 6, for "advancing" read --in--;
           next to last line, for "acvancing" read --advancing--.
Col. 1, line 48, after "receded" delete "by";
        line 49, before "an" insert --by--.
Col. 4, line 44, for "cam element 37" read --cam element 36--.
Col. 6, line 4, delete "of".
Col. 6, line 47, for "coacial" read --coaxial--.

Signed and sealed this 5th day of November 1974.

(SEAL)
Attest:

McCOY M. GIBSON JR.                C. MARSHALL DANN
Attesting Officer                  Commissioner of Patents